United States Patent [19]

von der Ohe

[11] Patent Number: 4,462,609

[45] Date of Patent: Jul. 31, 1984

[54] INDEPENDENT WHEEL SUSPENSION FOR MOTOR VEHICLES

[75] Inventor: Manfred von der Ohe, Stuttgart, Fed. Rep. of Germany

[73] Assignee: Daimler-Benz Aktiengesellschaft, Fed. Rep. of Germany

[21] Appl. No.: 333,991

[22] Filed: Dec. 23, 1981

[30] Foreign Application Priority Data

Dec. 23, 1980 [DE] Fed. Rep. of Germany ....... 3048755

[51] Int. Cl.³ .............................................. B60G 3/00
[52] U.S. Cl. .................................... 280/690; 180/73.4
[58] Field of Search ............... 280/675, 698, 699, 700, 280/701, 725, 726, 690; 180/73 TL

[56] References Cited

U.S. PATENT DOCUMENTS 4,269,432  5/1981  Inoue et al. ......................... 280/690

Primary Examiner—Richard A. Bertsch
Attorney, Agent, or Firm—Craig & Burns

[57] ABSTRACT

An independent rear wheel suspension for passenger motor vehicles, with a wheel carrier being held through upper and lower wishbones and guided by way of a track rod, offset with respect to an axis of rotation determined by points of articulation of the upper and lower wishbones on the wheel carrier. The track rod engages the wheel carrier and extends in a transverse direction of a vehicle. Respective wheel carriers are pivotable under an influence of a longitudinal force acting on the respective wheels about an instantaneous center of rotation, present in a side view of the wheel suspension, due to the fact that elastic resilience is provided in at least one of the connections to the vehicle body formed by the wishbones. Positions of the track rod and the instantaneous center of rotation of the wheel carrier are coordinated with one another in such a manner that, during a braking of the vehicle the wheel carrier is pivoted in a toe-in direction and/or, during a starting of the vehicle, the wheel carrier is pivoted in a toe-out direction.

21 Claims, 3 Drawing Figures

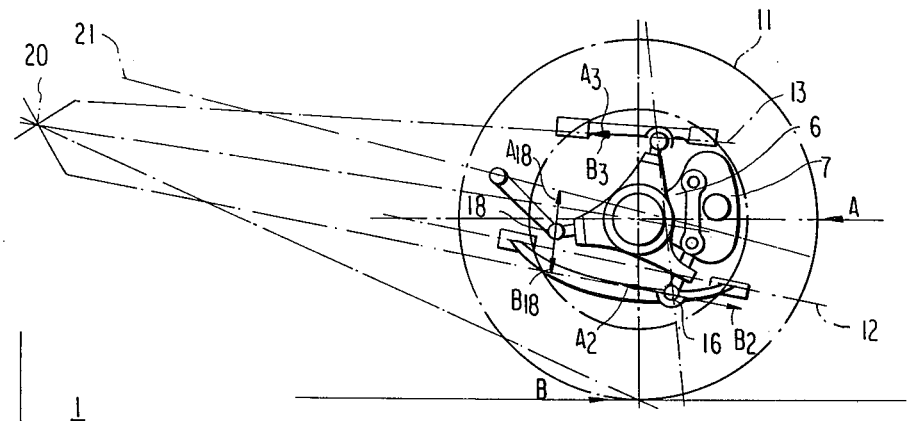
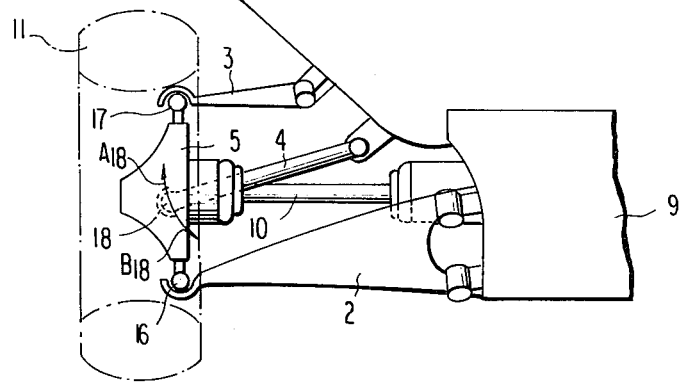
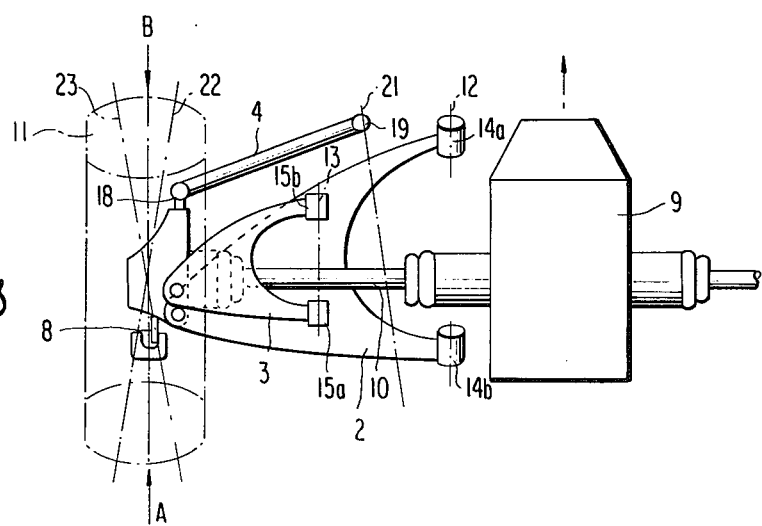

INDEPENDENT WHEEL SUSPENSION FOR MOTOR VEHICLES

BACKGROUND OF THE INVENTION

The present invention relates to a wheel suspension arrangement and, more particularly, to an independent wheel suspension for motor vehicles, especially a rear wheel suspension for passenger motor vehicles. A wheel carrier for each of the respective rear wheels is supported by way of upper and lower wishbones and is guided by way of a track rod which, offset with respect to the steering axis determined by the articulation of the upper and lower wishbones on the wheel carrier, is pivotally attached to the carrier and extends generally in a transverse direction of the vehicle. The wheel carrier being pivotable under an influence of longitudinal forces acting on the respective wheel, about an instantaneous center of rotation, present in a side view of the wheel suspension, by virtue of the fact that an elastic resilience is provided in at least one of the connections of the wishbones to a portion of the body of the vehicle.

Wheel suspension arrangements of the aforementioned type have been proposed which includes double wishbones rear axles in, for example, racing cars and sports cars. In these proposed suspensions, since comfort is only of minor concern, the bearing or connection points of the track rod and wishbones to the body of the vehicle as well as to the wheel carrier are constructed so as to be relatively hard. Additionally, with racing and sports cars, it is desirable to have relatively hard bearing or connection points since the intent is to have as rapid as possible a build-up of lateral, starting, and braking forces. By virtue of the provision of bearing points having a relatively hard construction, the connections between wishbones and the wheel carrier and vehicle body are all relatively rigid so that the lateral, starting, and braking forces noted above have little efect in altering the kinematics of the axle. Consequently, when deciding upon a positioning of the track rod, it is basically necessary to ensure only that the wheel maintains the desired track when its suspension is deflected through its full travel path.

On the other hand, if comfort factors are to be taken into consideration in the construction of a wheel suspension of the aforementioned double wishbone type, it is necessary to provide elastic mounting means in the bearing points or connections formed between the wishbones and the wheel carrier and the vehicle body. Preferably, elastic mountings are provided in the points of articulation of the wishbone and, if appropriate, also at the point of articulation of the track rod to the wheel carrier and vehicle body. As a result of the provision of elastic mountings, the track rod and wishbones move with and relative to one another under the forces which are encountered during a normal driving of a motor vehicle thereby resulting in track changes which may impair the handling characteristics of the vehicle during, for example, starting, braking, and also during changes of load.

SUMMARY AND OBJECT OF THE INVENTION

The aim underlying the present invention essentially resides in providing an independent wheel suspension arrangement of the aforementioned double wishbone type which employs a flexible or elastic support and utilizes movements of the track rod and wishbones with and relative to one another without impairing the overall handling characteristics of the motor vehicle.

In accordance with advantageous features of the present invention, a wheel suspension arrangement is provided wherein elastic resilient mounting means are provided in at least one of the connections between the suspension and the vehicle body such that positions of the track rod and instantaneous center of rotation of the wheel carrier are coordinated with one another in such a manner that, during braking, the wheel carrier is pivoted in a toe-in direction.

By virtue of the above-noted features of the present invention, during a braking operation of the motor vehicle, that is to say under the influence of braking forces exerted on the wheel at the road contact point, a torque is applied to the wheel carrier and, due to the resilient elastic support in at least one of the connections of the wishbones to the vehicle body, the torque results in a twisting of the wheel carrier in a plane determined by articulation points of the wishbones and the track rod on the wheel carrier. The above-noted plane extends essentially in a vertical direction and essentially in a longitudinal direction of the vehicle. By proper selection and construction of the elastic mounting means the instantaneous center of rotation, present in a side view of the suspension, about which the wheel carrier is twisted, may readily be determined.

By providing a track rod which extends generally transverse to the longitudinal direction of a vehicle, each twisting of the wheel carrier about the instantaneous center of rotation results, in dependence upon the position of the track rod, in longer or shorter pivoting distances for the articulation point of the track rod on the wheel carrier. Advantageously, in accordance with the present invention, the position of the track rod is such that during a twisting of the wheel carrier about the instantaneous center of rotation which arises under the influence of braking forces, the point of articulation of the track rod on the wheel carrier is shifted, thereby resulting in a corresponding pivoting of the track rod causing the wheel carrier to rotate about the steering axis in a toe-in direction. This situation would arise when, during the corresponding pivoting of the track rod, a length of the track rod projected on a horizontal plane is shortened.

During a starting of the motor vehicle, it is generally desirable to provide a tendency for the wheels to pivot in a toe-out direction and, in accordance with the independent wheel suspension of the present invention, the positions of the track rod and instantaneous center of rotation are coordinated with one another in such a manner that, during a starting of the vehicle, a pivoting in the toe-out direction is obtained. Accordingly, the same basic considerations noted above with regard to the pivoting in a toe-in direction during braking fundamentally apply; however, it must be remembered that, during a starting of the vehicle, no torque is exerted on the wheel carrier but merely a starting force applied in the center of the wheel. Because of the movement of each of thearticulation or connecting points of the respective wishbones on the wheel carrier is relative to one another under the influence of the starting force, the starting force results in a pivoting of the wheel carrier in the above-noted plane; however, the pivoting occurs in an opposite direction to the twisting occurring during braking. That is to say, control of the twisting or pivoting about an instantaneous center of rotation, present in a side view, requires only that the track rod be arranged or disposed so that, as a result of the above-noted twisting of the wheel carrier about the instantaneous center of rotation under the influence of the starting forces, the articulation point of the track rod on the wheel carrier is pivoted in such a manner that the result is that the wheel carrier is rotated about the steering axis in a toe-out direction.

In accordance with still further features of the present invention, the pivoting in a toe-in direction during a braking operation of the vehicle and the pivoting in a toe-in direction during a starting of the vehicle may be achieved when elastic resilient mounting means are provided at least in the connection to the vehicle body formed by the lower wishbone, Accordingly, to achieve the desired pivoting, with respect to the forces occurring during a starting operation, the resilience of the elastic mounting means in the connection of the lower wishbone to the vehicle body is greater than the resilience of the elastic mounting means in the connection formed by the upper wishbone.

Advantageously, in accordance with the present invention, the resilience of the elastic mounting means are coordinated such that, during a braking operation the instantaneous center of rotation of the independent wheel suspension is disposed in the region of the center axis of the wheel since, in this manner, a relatively long pivot distance may be obtained for an articulation point of the track rod on a side of the wheel carrier, which articulation point may be favorably located in terms of a construction of the overall suspension system.

If, in accordance with the present invention, the sought after or desired steering effects are to be achieved during both starting and braking, then, during starting, the instantaneous center of rotation is expediently located near a transversely extending center plane of the wheel and at least at a height of a point of articulation of the upper wishbone at the wheel carrier.

In accordance with the present invention, the track rod may be positioned or disposed either forwardly of or rearwardly of the transversely extending center plane of the wheel, as viewed in a normal driving direction of the vehicle. With the track rod disposed in either of the noted positions, it is expedient, in order to achieve the desirable effects noted above, to arrange the track rod so as to extend obliquely inwardly toward a longitudinal center plane of the vehicle and in an upward direction. Advantageously, a point of articulation of the track rod on the wheel carrier is located forwardly of the transversely extending center plane of the wheel and approximately at a height of the wheel axle so that the articulation point of the track rod on the side of the wheel carrier is offset upwardly with respect to the point of articulation of the lower wishbone on the wheel carrier.

In addition to attempting to obtain the above-noted track control during starting and braking, changes in loading during cornering of the motor vehicle must also be considered and, in independent wheel suspensions, there is a basic requirement that the toe-in must remain at least substantially constant when the suspension is deflected through its full path of travel or should at least vary only symmetrically during compression and extension of the suspension of the vehicle so as to prevent a roll steering effect during ultimate spring movements of the suspension. This may be achieved in accordance with the present invention if the articulation point of the track rod on the vehicle body side is disposed at a so-called ideal point or on an ideal straight line.

More particularly, an ideal point is determined by moving the wheel carrier through the spring travel path without guidance by the track rod and with a predetermined toe-in position such as, for example, the zero toe-in position being maintained. When the wheel carrier is guided in this manner, with the toe-in being maintained constant, the articulation point of the track rod at the side of the wheel carrier, which point is not guided throught the track rod, describes a curve in space which represents a generally circular arc, which circular arc defines a plane in which a center point representing the ideal point is located accordingly, when the articulation of the track rod at the vehicle body end lies at this point, the toe-in position which is predetermined in order to define this point is virtually maintained.

If the articulation point of the track rod cannot be realized at the ideal point, then the suspension arrangement can be designed to have predetermined symmetrical toe-in changes which will occur over the full suspension travel of the wheels when the articulation point of the track rod at the vehicle body end is disposed on the so-called ideal straight line which is represented by a straight line passing through the ideal point and perpendicular to the plane defined by the above-noted circular arc.

Accordingly, it is an object of the present invention to provide an independent wheel suspension for motor vehicles, especially a rear wheel suspension for passenger motor vehicles, which avoids, by simple means, shortcomings and disadvantages encountered in the prior art.

Another object of the present invention resides in providing an independent wheel suspension for motor vehicles which utilizes movements of the track rod and wishbones of the suspension so as to ensure a toeing-out of the respective wheels during a starting of the motor vehicle and a toeing-in during a braking or changes in loads of the vehicle.

Another object of the present invention resides in providing an independent wheel suspension for motor vehicles which improves the overall handling characteristics of the vehicle.

A still further object of the present invention resides in providing an independent wheel suspension for motor vehicles which enables the attainment of at least symmetrical toe-in changes over a full suspension travel path of the respective wheels.

Yet another object of the present invention resides in providing an independent wheel suspension for motor vehicles which enables the maintenance of a predetermined toe-in position throughout an entire spring or suspension travel path of the respective wheels.

A still further object of the present invention resides in providing an independent wheel suspension for motor vehicles which minimizes if not avoids the occurrence of oversteering during deceleration in cornering maneuvers of the vehicle.

Another object of the present invention resides in providing an independent wheel suspension for motor vehicles which functions reliably under all load conditions of the vehicle.

A further object of the present invention resides in providing an independent wheel suspension for motor vehicles which is simple in construction and therefore relatively inexpensive to manufacture. These and other objects, features, and advantages of the present invention will become more apparent from the following description when taken in connection with the accompanying drawing which shows, for the purposes of illustration only, one embodiment in accordance with the present invention, and wherein:

FIG. 1 is a partially schematic rear view of a rear wheel suspension for a passenger motor vehicle constructed in accordance with the present invention;

FIG. 2 is a side view of the rear wheel suspension of FIG. 1; and

FIG. 3 is a plan view of the rear wheel suspension of FIGS. 1 and 2.

Referring now to the drawing wherein like reference numerals are used throughout the several views to designate like parts and, more particularly, to FIG. 1, according to this figure, a vehicle 1, such as,for example, a passenger motor vehicle, includes a least two independently suspended driven wheels, only one of which is shown. The drive mechanism for each wheel includes half-shafts 10 and each wheel is supported at the vehicle 1 by wheel guidance means articulated at the vehicle body either directly or through interposed auxiliary supports (not shown). In this connection, only portions relating directly to the rear wheel suspension of the present invention are partially and schematically illustrated in FIG. 1, and only one side of the vehicle 1 is illustrated because of the symmetry of construction of the independent wheel suspension with respect to a longitudinal center plane of the vehicle 1. The wheel guidance means includes a lower wishbone 2, an upper wishbone 3 and a track rod 4 with a wheel carrier 5 being guided by the upper and lower wishbones 2, 3 and the track rod 4.

As shown most clearly in FIGS. 2 and 3, each of the wheels has associated therewith a brake anchor plate 6 with a caliper 7 of the disc brake being attached to the wheel carrier 5 with a disc of the disc brake being designated by the reference numeral 8. The half-shafts 10 are mounted in the wheel carrier 5, with the half-shafts 10 projecting from a differential gear means 9. The brake disc 8 and wheel 11 are connected to the respective half-shafts 10, with the half-shafts 10 being formed as cardan shafts.

As shown in FIGS. 1-3, the lower and upper wishbones 2, 3extend essentially transversely to a longitudinal direction of the vehicle and are articulated on a portion of the body of the vehicle 1 so as to be pivotable about axes of rotation 12, 13 which extend generally in the longitudinal direction of the vehicle. The lower wishbone 2 is articulated at the vehicle body at articulation points 14a, 14b; whereas, the upper wishbone 3 is articulated at the vehicle body at articulation points 15a, 15b. The articulation points are intrinsically elastically resilient and, for this purpose, the upper and lower wishbones may be mounted at the body of the vehicle in a conventional manner by, for example, resilient bushings or the like.

In the illustrated embodiment, the lower wishbone 2 and upper wishbone 3 are respectively connected to the wheel carrier 5 by ball and socket joints 16, 17, which determine the steering axis of the wheel. A further ball and socket joint 18 is provided at the wheel carrier 5 for defining an articulation point for the track rod 4. Preferably, the track rod 4 has a "hard" articulation point at the body of the motor vehicle, which articulation point may, for example, be formed by a ball and socket joint 19. The track rod 4 is positioned such that, starting at the point of articulation of the ball and socket joint 18 at the wheel carrier 5, the track rod 4 extends obliquely forwardly and upwardly, as viewed in a normal driving direction of the vehicle.

Positions of the respective elements which provide, in a desirable manner, a controlled support starting and braking of the motor vehicle are selected for the axis of rotation 12, 13 of the lower and upper wishbones 2, 3. For this purpose, as shown most clearly in FIG. 2, the axis of rotation 13 of the upper wishbone 3 extends essentially horizontally; whereas, the axis of rotation 12 for the lower wishbone 2 extends obliquely forwardly and in an upward direction so that a point of intersection 20 of the axis of rotation 12 and 13, in a side view, is disposed above a center plane of the wheel.

In order to prevent undesirable toe-in changes during deflection of the wheel suspension as the wheel suspension travels through its full travel path, the articulation point of the track rod 4 on the body side is arranged so that it is located along a so-called ideal straight line represented by the phantom line designated 21. In the illustrated embodiment, as shown in FIG. 2, the ideal straight line, in a side view, extends obliquely forwardly and upwardly; whereas, in a plan view, shown in FIG. 3, the straight line extends obliquely forwardly and outwardly.

In wheel suspension or guidance systems such as proposed by the present invention, a path of the ideal straight line 21 is obtained when, on the one hand, full support for starting and braking is provided and, on the other hand, there is provided an instantaneous center of rotation located at least above a plane of the ground. The ideal straight line 21 may be determined by first fixing the so-called ideal point which is the point at which the track rod 4 is to be articulated on the vehicle body if there are no or practically no toe-in changes intended to arise. The ideal point is determined by moving the wheel 11 over the spring travel path, without the wheel 11 being compelled through the track rod 4 to rotate about the steering axis, and by following through so that a desired toe-in such as, for example, a zero toe-in is maintained. The articulation point defined by the ball and socket joint 18 of the track rod 4 on the wheel carrier 5, in this situation, would describe a curved path which may be represented approximately as a circular arc. A plane in which a center point of the circular arc is located is determined in space by the circular arc. This center point in the plane corresponds to the so-called ideal point. The ideal straight line 21 is represented as a straight line extending through the ideal point perpendicularly to the plane defined by the circular arc. While, as noted above, virtually no toe-in changes occur when the track rod 4 is articulated at the ideal point, the locating or disposing of the articulation point of the track rod 4 on the body of the vehicle 1 along the ideal straight line 21 away from the ideal point allows a track control in which toe-in changes do occur; however, such changes are symmetrical so that steering effects during ultimate deflection of the suspension are thereby avoided whereby at least no roll-steering behavior of the vehicle 1 is associated with the change in the toe-in during alternate deflection.

On the other hand, certain tendencies for a variation in the toe-in may be thoroughly desirable since, with the provision of elastic mounting means in the wheel suspension or guidance system, any undesirable toe-in changes must at least be compensated for. This would be desirable, with respect to toe-in changes which occur in an undesirable manner during a starting, braking, or cornering of the motor vehicle in order to present a toeing-out of the wheel 11 during braking or toeing-in during starting or at least to reduce deviations in either a toeing-in or toeing-out direction.

According to the present invention, in order to achieve the above-noted desirable effects, use is made of the fact that, under the influence of braking forces designated B or starting forces designated A, the wheel carrier 5, guided through the lower and upper wishbones 2, 3, due to the elastic or resilient nature of the supporting means in the connections of the wishbones 2, 3 to the body of the vehicle, attempts to execute a rotary movement about the instantaneous center or rotation which is located essentially in a plane defined by the articulation points of the lower and upper wishbones 2, 3 and the track rod 4 on the wheel carrier 5. Consequently, under the influence of the forces A, B, a twisting of the wheel carrier 5 first occurs essentially in a vertical plane extending in a longitudinal direction of vehicle 1. The twisting is utilized, together with the ability of the wheel carrier 5 to twist about the steering axis determined by the points of articulation 16, 17, of the lower and upper wishbones 2, 3 of the wheel carrier 5, and the corresponding guidance through the track rod 4 so that the wheel carrier 5, which is first twisted with respect to the instantaneous center of rotation under an appropriate force influence is, at the same time, pivoted about its steering axis through the track rod 4 and the amount of pivoting thus provided in the toe-in or toe-out direction depends on what effective change in length of the track rod 4 is associated with the particular twisting of the wheel carrier 5 about the instantaneous center of rotation.

In the illustrated embodiment, the elasticity or resilience of the supporting means in the connection areas of the wheel carrier 5 to the vehicle 1, that is to say the resiliency or elasticity at the point of articulations of the lower and upper wishbones 2, 3 to the body of the vehicle 1 are selected so that, with respect to longitudinal forces that occur during starting and braking, the resilience of the lower wishbone 2 is greater than a resilience of the upper wishbone 3. Thus, when a braking force B occurs, a displacement of the articulation defined by the ball joint 16 of the lower wishbone 2 on the wheel carrier 5 results in a direction of the arrow $B_2$, while the point of articulation defined by the ball and socket joint 17 of the upper wishbone 3 on the wheel carrier 5 shifts in a direction designated by the arrow $B_3$. The extent of shifting movements is unequal and is greater for the lower articulation point, i.e., ball joint 16, than for the upper articulation point, i.e., the ball and socket joint 17. Consequently, the wheel carrier 5 rotates about a center of rotation located in a vicinity of a center axis of the wheel 11, with the result being that the articulation point of the track rod 4 on the wheel carrier 5, that is, the ball and socket joint 18, shifts downwardly in the direction of the arrow designated $B_{18}$. A twisting of the wheel carrier 5 about the steering axis in the toe-in direction results in the last-mentioned shifting movement, i.e., the downward movement of joint 18, which in turn results in a shortening of an effective length of track rod 4. A shortening of the projected length of the track rod 4 as schematically illustrated in FIG. 3, wherein a position of the longitudinally extending center plane of the wheel is diagrammatically illustrated in phantom line 22.

With a wheel suspension constructed in accordance with the illustrated embodiment, during a braking operation, the braking force B engages at the wheel and/or road contact point and the braking torque also acts on the wheel carrier and, during a starting of the motor vehicle, the force A engages at the center axis of the wheel 11 and, as illustrated, the direction of force engagement is, in addition, in the opposite direction to the direction of engagement of the braking force B. By providing elastic or resilient mounting means in the connection areas of the wheel carrier 5 to the body of the vehicle 1, the articulation points of the lower and upper wishbones 2, 3 on the side of the wheel carrier 5, that is, the ball and socket joints 16, 17, are both shifted in the same direction and, due to the different resiliencies or elasticities of the mounting means or also because of the different lengths of lever arms in the case of mounting means having the same resiliency or elasticity, the lower articulation is shifted a greater distance as designated by the arrow $A_2$ than the upper articulation designated by the arrow $A_3$. Consequently, a pivoting takes place about a center of rotation which is located above the upper articulation in the region of a transversely extending center plane of the wheel 11. The result of this pivoting for the articulation point, that is, the ball and socket joint 18, of the track rod 4 on the wheel carrier 5 is that it moves a distance in a direction designated by the arrow $A_{18}$ thereby resulting, due to an adjustment of the track rod 4 obliquely downwardly, in a lengthening of the effective or projected length of the track rod, whereby the wheel carrier 5 is pressed or displaced outwardly in the toe-out direction so that the longitudinally extending center plane 23 of the wheel assumes a position indicated in phantom lines in FIG. 3.

The tendency achieved by the constructional features described above for the wheel to be steered somewhat in a toe-out direction under the starting force A also results in the fact that, in the case of deceleration during a cornering of the motor vehicle and the reverses of forces which are caused thereby, the wheel 11 at least tends to be shifted in a toe-in direction so that a so-called oversteer during deceleration in cornering is counteracted at least by the wheel 11 on the outside of the curve.

As can readily be appreciated, it is also possible in accordance with the present invention for the track rod 4 to be disposed or located behind the transversely extending central plane of the wheel without any change in the principles described hereinabove in connection with the illustrated embodiment.

While I have shown or described several embodiments in accordance with the present invention, it is understood that the same is not limited thereto but is susceptible of numerous changes and modifications as known to one having ordinary skill in the art, and I therefore do not wish to be limited to the details shown and described herein, but intend to cover all such modifications as are encompassed by the scope of the appended claims.

I Claim:

1. An independent wheel suspension for a motor vehicle, the wheel suspension including a wheel carrier means for carrying each suspended wheel, means for supporting each wheel carrier means at a body portion of the vehicle in a manner allowing pivoting of the wheel carrier means in response to the influence of a longitudinal force, said means for supporting including upper and lower wishbone means connected to each wheel carrier means, said pivoting occurring about an instantaneous center of rotation as viewed from the side, track rod means extending generally transversely of the vehicle and connected to the respective carrier means and the body portion of the vehicle for guiding a movement of the carrier means, and means for elastically connecting at least a portion of the supporting means to the body portion of the vehicle, said track rod means being offset with respect to an axis of rotation defined by points of connection of the upper and lower wishbone means at the wheel carrier means and being arranged with respect to the carrier means in such a manner that, during a braking of the vehicle, the wheel carrier means and respective wheel are pivoted in a toe-in direction.

2. An independent wheel suspension according to claim 1, wherein, during a braking of the vehicle, the instantaneous center of rotation is disposed in an area near a center axis of the respective wheels.

3. An independent wheel suspension according to one of claims 1 or 2, wherein the track rod means respectively extend from each wheel carrier means in an obliquely inward and upward ascending direction.

4. An independent wheel suspension according to claim 3, wherein the track rod means are disposed forwardly of a transversely extending center plane of the wheel, as viewed in a normal driving direction of the vehicle.

5. An independent wheel suspension according to claim 3, wherein the track rod means are disposed rearwardly of a transversely extending center plane of the wheel, as viewed in a normal driving direction of the vehicle.

6. An independent wheel suspension according to claim 5, wherein the track rod means are connected to the respective carrier means at a position having a height which approximately corresponds to a height of the center axis of the respective wheel.

7. An independent wheel suspension for a motor vehicle, the wheel suspension including a wheel carrier means for carrying each suspended wheel, means for supporting each wheel carrier means at a body portion of the vehicle in a manner allowing pivoting of the wheel carrier means in response to the influence of a longitudinal force, said means for supporting including upper and lower wishbone means connected to each wheel carrier means, said pivoting occurring about an instantaneous center of rotation as viewed from the side, track rod means extending generally transversely of the vehicle and connected to the respective carrier means and the body portion of the vehicle for guiding a movement of the carrier means, and means for elastically connecting at least a portion of the supporting means to the body portion of the vehicle, said track rod means being offset with respect to an axis of rotation defined by points of connection of the upper and lower wishbone means at the wheel carrier means and being arranged with respect to the carrier means in such a manner that, during a starting of the motor vehicle, the wheel carrier means and respective wheels are pivoted in a toe-out direction.

8. An independent wheel suspension according to one of claims 1 or 7 wherein the wheel suspension is a rear wheel suspension of a passenger motor vehicle.

9. An independent wheel suspension according to claim 8, wherein the means for elastically connecting includes elastic mounting means provided at least at a connection between the lower wishbone means and the body portion of the vehicle.

10. An independent wheel suspension according to claim 9, wherein, during a braking of the vehicle, the instantaneous center of rotation is disposed in an area near a center axis of the respective wheels.

11. An independent wheel suspension according to claim 10, wherein during a starting of the vehicle, the instantaneous center of rotation is disposed in an area near a transversely extending center plane of the respective wheel at a position at least as high as a point of connection of the upper wishbone means to the wheel carrier means.

12. An independent wheel suspension according to claim 11, wherein the track rod means respectively extend from each wheel carrier means in an obliquely inward and upward ascending direction.

13. An independent wheel suspension according to claim 12, wherein the track rod means are disposed rearwardly of the transversely extending center plane of the wheel, as viewed in a normal driving direction of the vehicle.

14. An independent wheel suspension according to claim 13, wherein the track rod means are connected to the respective carrier means at a position having a height which approximately corresponds to a height of the center axis of the respective wheels.

15. An independent wheel suspension according to claim 12, wherein the track rod means are disposed forwardly of the transversely extending center plane of the wheel, as viewed in a normal driving direction of the vehicle.

16. An independent wheel suspension according to claim 1, wherein the track rod means is arranged with respect to the carrier means in such a manner that, during a braking of the vehicle, the carrier means are pivoted in a toe-in direction.

17. An independent wheel suspension according to one of claims 7 or 16, wherein, during a braking of the vehicle, the instantaneous center of rotation is disposed in an area near a center axis of the respective wheels.

18. An independent wheel suspension according to claim 17, wherein the track rod means respectively extend from each wheel carrier means in an obliquely inward and upward ascending direction.

19. An independent wheel suspension according to claim 18, wherein the track rod means are disposed rearwardly of a transversely extending center plane of the wheel, as viewed in a normal driving direction of the vehicle.

20. An independent wheel suspension according to claim 19, wherein the track rod means are connected to the respective carrier means at a position having a height which approximately corresponds to a height of a center axis of the respective wheels.

21. An independent wheel suspension according to claim 18, wherein the track rod means are disposed forwardly of a transversely extending center plane of the, as viewed in a normal driving direction of the vehicle.

* * * * *